United States Patent [19]

Holderle et al.

[11] Patent Number: 4,711,225
[45] Date of Patent: Dec. 8, 1987

[54] CONNECTING PIECE BETWEEN THE CARBURETOR AND THE COMBUSTION CHAMBER OF AN INTERNAL COMBUSTION ENGINE

[75] Inventors: Hans Holderle, Freiberg; Jürgen Wolf, Stuttgart; Horst Eckhart, Auenwald; Werner Vonderau, Waldrems, all of Fed. Rep. of Germany

[73] Assignee: Andreas Stihl, Waiblingen, Fed. Rep. of Germany

[21] Appl. No.: 20,670

[22] Filed: Mar. 2, 1987

[30] Foreign Application Priority Data

Mar. 1, 1986 [DE] Fed. Rep. of Germany ....... 3606708

[51] Int. Cl.$^4$ ............................................. F02M 29/00
[52] U.S. Cl. ................................. 123/590; 123/52 M
[58] Field of Search ................ 123/590, 52 M, 52 MC

[56] References Cited

U.S. PATENT DOCUMENTS

| | | | |
|---|---|---|---|
| 1,305,174 | 5/1919 | Smith | 123/52 M |
| 2,017,043 | 10/1935 | Galliot | 123/52 MC |
| 3,735,744 | 5/1973 | Brudy et al. | 123/590 |
| 3,826,235 | 7/1974 | Pasbrig | 123/590 |
| 4,092,966 | 6/1978 | Prosen | 123/590 |

FOREIGN PATENT DOCUMENTS 395901 7/1933 United Kingdom ............... 123/590

Primary Examiner—E. Rollins Cross
Attorney, Agent, or Firm—Walter Ottesen

[57] ABSTRACT

A connecting piece interconnects the carburetor and combustion chamber of an internal combustion engine. The fuel-air mixture produced in the carburetor flows to the combustion chamber through the connecting piece in a primary flow direction. A plurality of closely spaced protrusions are provided on the inner wall of the connecting piece and these protrusions are disposed one behind the other and are offset from one another in the primary flow direction of the fuel-air mixture such that the formation of axially parallel channels is avoided. This embodiment prevents the fuel film deposited on the inner wall of the connecting piece from being completely aspirated all at once into the combustion chamber, which would cause a severe overenrichment of the mixture and hence a drop in rpm. Because of the many protrusions, the fuel film that is deposited tears off in the smallest possible pieces when being aspirated, so that only small parts of this film ever reach the combustion chamber at the same time. Fluctuations in the idling rpm are considerably lessened with a connecting piece configured in this manner.

11 Claims, 11 Drawing Figures

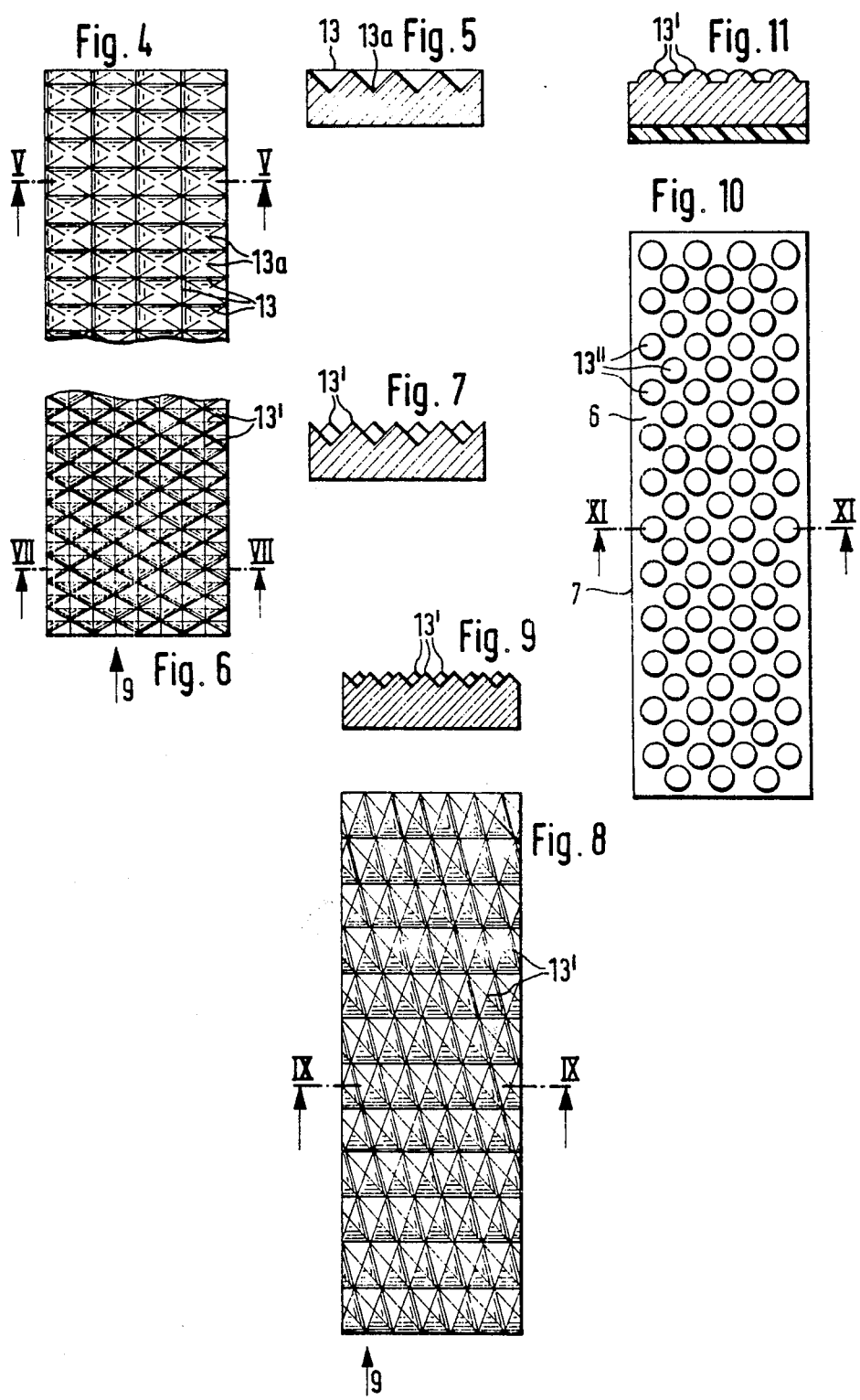

CONNECTING PIECE BETWEEN THE CARBURETOR AND THE COMBUSTION CHAMBER OF AN INTERNAL COMBUSTION ENGINE

FIELD OF THE INVENTION

The invention relates to a connecting piece between the carburetor and the combustion chamber of an internal combustion engine for tools such as motor-driven chain saws. The internal combustion engines utilized in such tools are especially two-stroke engines. The connecting piece has a plurality of mutually adjacent protrusions distributed over a large portion of the inner periphery of its wall.

BACKGROUND OF THE INVENTION

Connecting pieces interconnect the carburetor and the combustion chamber. The fuel-air mixture generated in the carburetor passes through the connecting piece to reach the combustion chamber of the engine.

Known connecting pieces of this kind are configured as smooth as possible on their inside wall to keep flow resistance between the carburetor and the combustion chamber, and the attendant power losses, as low as possible.

During operation, when the fuel-air mixture flows from the carburetor to the combustion chamber, some of the fuel is deposited on the inner wall of the connecting piece. When the inner wall is smooth, a closed film of fuel forms here which is particularly disadvantageous in the lower rpm range (idling range). The fuel film deposited on the inner wall, which has a considerably greater viscosity than the fuel that is dissolved in droplet form, flows inside the connecting piece along the connecting piece wall back to the carburetor or into the combustion chamber, depending on the pressure conditions. More precise testing has shown that the fuel film initially flows back toward the carburetor, where at the interface, between carburetor and connecting piece, for instance, at an edge between the connecting piece and the carburetor, it backs up until it is abruptly aspirated virtually in its entirety into the combustion chamber. This abruptly delivered quantity of fuel results in a pronounced overenrichment of the mixture, causing the engine rpm to drop suddenly, until a normal mixture is again delivered for combustion.

This aspiration into the combustion chamber of the fuel film formed on the inner wall of the connecting piece takes place periodically. In a two-stroke engine of a motor-driven chain saw, this process is repeated at approximately ten-second intervals. During the time when the fuel film is building up on the connecting piece wall and backing up there, fuel is taken from the fuel-air mixture, so that an overly lean mixture is supplied to the engine. When the fuel film detaches from the wall, the mixture composition abruptly changes into an overly rich mixture. This causes considerable fluctuations in the idling rpm, which may be in the order of magnitude of 500 rpm, for example. These idling rpm fluctuations occur particularly in modern, lightweight engines, in which the revolving masses have been largely reduced, so that angular momentum provides only limited speed compensation. Without structural changes, the problem can be solved only by setting the idling rpm correspondingly higher, which is uneconomical and also involves the risk that the clutch engagement rpm will be exceeded in tools having centrifugal coupling. Exact setting of the idling rpm is impossible because of the fluctuations that occur and these fluctuations also unnecessarily increase engine wear.

In tools that are operated not merely in one particular position but also in unusual positions, having for instance to be rotatingly manipulated through 180°, these rpm fluctuations during idling occur to an increased extent when the tool is swung about, because with the abruptly changing pressure conditions in the carburetor and the influence of gravity, the fuel film often migrates along the connecting piece wall from the carburetor to the combustion chamber. This triggers speed fluctuations that can cause misfiring and even stalling of the engine, especially when there is a sudden, severe overenrichment of the mixture.

A connecting piece having a textured inner wall, which is intended to lessen the sudden detachment of the film from the wall, is already known. This connecting piece has annular protrusions of rectangular cross section disposed one behind the other in axial direction. The protrusions are interrupted by channels extending in the axial direction of the connecting piece so that a plurality of rows of rectangular protrusions are formed and distributed over the periphery.

This connecting piece still does not solve the problems addressed above because the relatively large protrusions on the inner wall can not retain relatively large portions of the fuel film deposited thereon when aspiration into the combustion chamber takes place. In particular, the axially parallel longitudinal channels between the protrusions cause relatively large quantities of fuel to reach the combustion chamber abruptly, for instance, when the tool is swung about, and because of the altered pressure conditions in the carburetor, liquid fuel reaches the wall of the connecting piece. This fuel then runs along the axially parallel channels directly into the combustion chamber and causes a brief drop in rpm. Accordingly, even this connecting piece having structure on the inner wall does not provide a satisfactory solution.

SUMMARY OF THE INVENTION

It is an object of the invention to provide a connecting piece which prevents a sudden aspiration of a fuel film into the combustion chamber and which prevents fuel flow along the connecting piece wall.

Accordingly, it is a feature of the invention to provide a plurality of closely spaced protrusions one behind the other in the primary flow direction of the gasoline mixture flowing through the connecting piece so as to avoid the formation of axially parallel channels.

With the connecting piece configured in this manner, the above-mentioned disadvantages are avoided, so that the internal combustion engine has a substantially constant idling rotational speed (rpm). With the protrusions disposed one behind the other in the axial direction of the connecting piece, a flow of fuel along the connecting piece wall is counteracted so that a fuel film deposited on the wall tears off upon aspiration into the combustion chamber, and only a small portion of this fuel abruptly enters the combustion chamber. Although the embodiment according to the invention does not entirely prevent fuel from becoming deposited on the connecting piece wall, nevertheless, an abrupt aspiration of the entire film into the combustion chamber is avoided. A backup at the crossover into the carburetor is also prevented because small amounts of fuel are retained at each protrusion. With the connecting piece of the invention, the time intervals at which a portion of the fuel becoming deposited on the wall is aspirated into the combustion chamber are extremely short so that only correspondingly small quantities of the fuel deposited on the wall can ever get into the combustion chamber. This considerably lessens the fluctuations in the idling rpm thereby assuring quiet and steady operation of the engine during idling.

According to another feature of the invention, the protrusions are distributed over the entire inside periphery of the connecting piece, so that even when the tool is swung about, if the supply of fuel-air mixture to the carburetor is briefly changed because of the altered pressure conditions, the idling rpm remains substantially constant, since a direct flow of liquid fuel along the connecting piece wall is effectively prevented by the protrusions, which are disposed offset from one another in the axial direction. A particularly important feature here is that the protrusions are distributed over the entire inner periphery of the connecting piece, so that in any position, a flow along the inner wall of the connecting piece is prevented.

It is a particularly advantageous feature of the invention to arrange the protrusions on helical paths along the inner wall of the connecting piece, because in this way the flow of liquid is continually deflected away from the axial direction of the connecting piece, and this very quickly leads to tearing off of the fuel film.

According to another feature of the invention, individual protrusions are approximately hemispherical or prismatic in shape, preferably pyramidal, so that near the connecting piece wall they present the maximum possible resistance to the fuel film and, toward the center of the connecting piece they present the least possible resistance to the fuel-air mixture flowing therethrough, so that power losses from turbulence in the peripheral region are largely avoided.

So that the tearing off of the fuel film becoming deposited on the wall is assured even under unfavorable conditions, the protrusions may be configured such that they taper to a point in the direction toward the axis of the connecting piece. In a simple and at the same time effective manner, the protrusions can also be attained by cross-knurling the inside of the connecting piece, because the cross-knurling produces a number of successive protrusions and thereby assures rapid tearing off of the fuel film adhering to the wall, yet also presents relatively low wall friction resistance to the fuel-air mixture flowing therethrough.

A connecting piece is advantageously configured with the aforementioned protrusions as a single piece; however depending on requirements, it may be more advantageous to provide a suitable insert having an inner profile and to introduce the same into a connecting piece having a smooth inner wall.

BRIEF DESCRIPTION OF THE DRAWINGS

FIG. 4 shows the inner wall of a connecting piece according to an embodiment of the invention;

FIG. 5 is a section taken along the line V—V of FIG. 4;

FIG. 6 shows a further variation of the configuration of the inner wall according to another embodiment of the invention and in a view corresponding to that of FIG. 4;

FIG. 7 is a section taken along the line VII—VII of FIG. 6;

FIG. 8 is a modified configuration of the inner wall with a helical course of the paths of successive protrusions;

FIG. 9 is a section taken along the line IX—IX of FIG. 8;

FIG. 10 shows another embodiment of the invention wherein the protrusions on the inner wall of a connecting piece have a semi-spherical shape; and, FIG. 11 is a section view taken along the line XI—XI of FIG. 10.

DESCRIPTION OF THE PREFERRED EMBODIMENTS OF THE INVENTION

Figure 1:
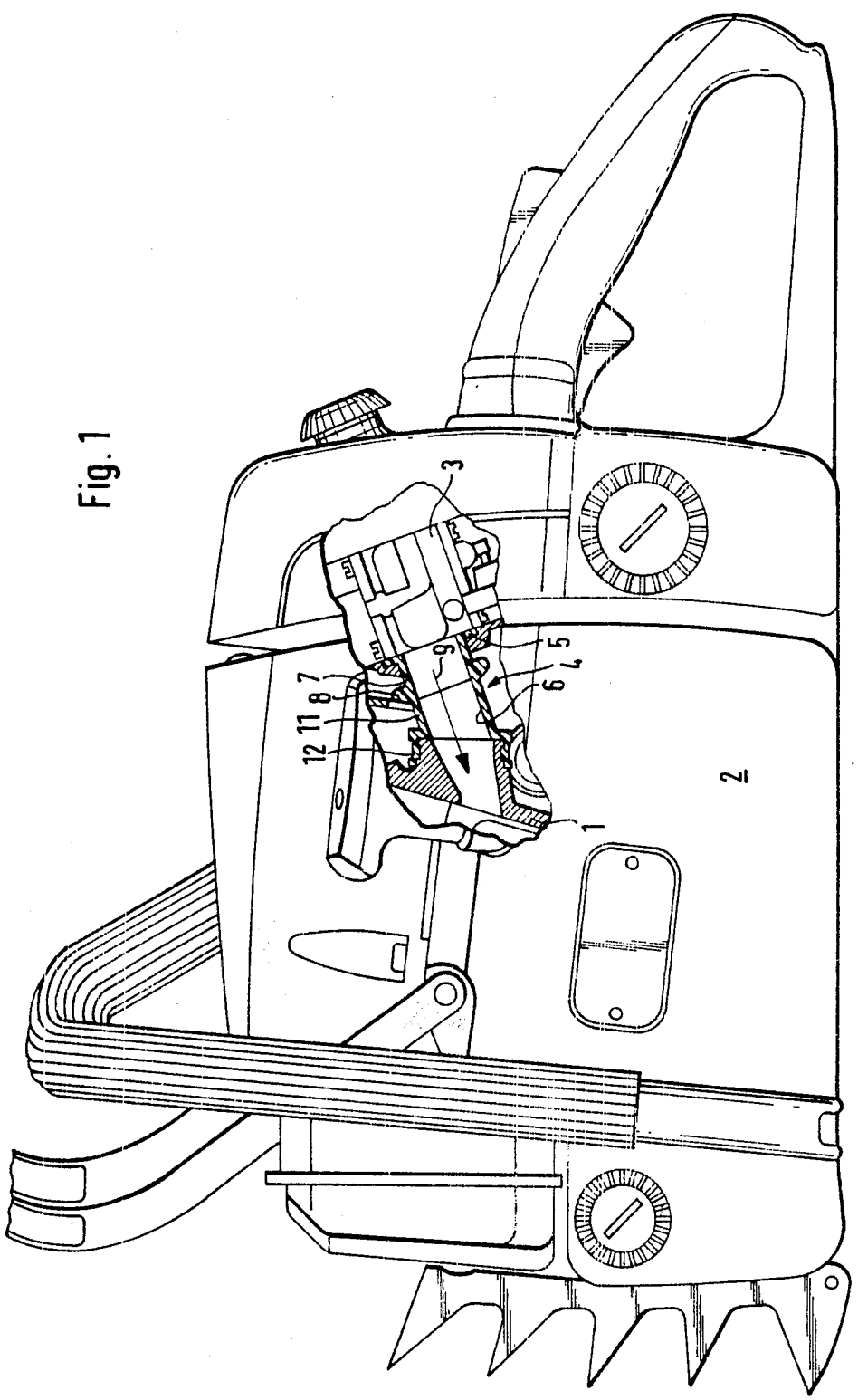
FIG. 1 is a side elevation view of the power head of a motor-driven chain saw wherein a portion of the housing is broken away to show a connecting piece according to the invention arranged between the carburetor and the combustion chamber of the engine.
Figure 2:
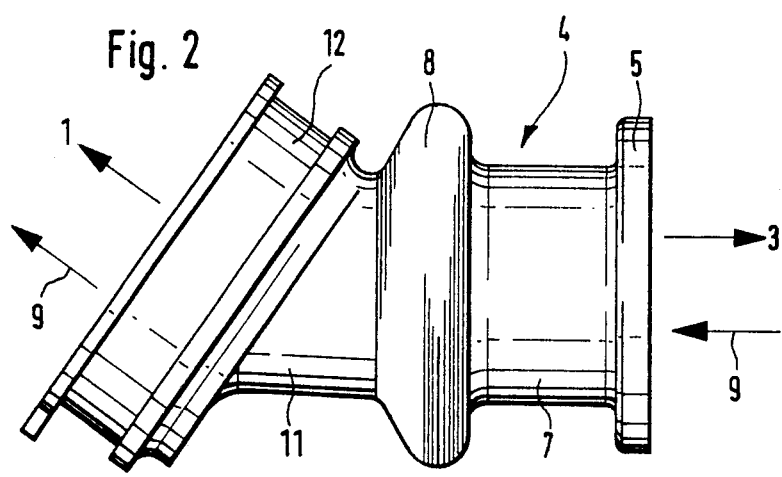
FIG. 2 is a side elevation view of the connecting piece shown in FIG. 1 and here drawn to a larger scale.

The tool shown partly in section in FIG. 1 is a motor-driven chain saw, which in this embodiment is equipped with an internal combustion engine 1 (only the intake opening of which is shown) operating pursuant to the two-stroke principle. Via a centrifugal coupling (not shown), the engine 1 drives the work tool which, in this embodiment is a saw chain (not shown) revolving on a guide bar. The entire drive unit is disposed in a housing 2, in which the engine 1 and the associated carburetor 3 are mounted. The carburetor 3 and engine 1 are connected with one another by means of a connecting piece 4 in the form of an elbow. The fuel-air mixture produced in the carburetor is carried to the combustion chamber of the engine 1 through this connecting piece 4. The connecting piece 4 is shown in detail in FIGS. 2 and 3.

Since the intake opening of the engine 1 and the carburetor outlet are not aligned with one another, the connecting piece 4 in this version is embodied as an elbow to span an angle of approximately 30° between the carburetor 3 and the intake opening of the engine 1. The elbow 4 has a round cross section and on the side toward the carburetor, the elbow has a flange 5 with which it rests tightly against the outside of the carburetor 3, such that the inner wall 6 of the elbow is flush with the inner wall of the carburetor outlet. From the flange 5, the elbow 4 extends with a hollow cylindrical part 7 as far as an adaptor portion 8, which has an approximately U-shaped cross section and which defines an annular groove at the inner wall 6 of the elbow with an annular projection on the outside of the elbow.

So that the flow between the carburetor 3 and the engine 1 will not tear off at the inner groove formed by the adaptor portion 8, a guide ring 10 is provided inside the adaptor portion 8 directly downstream of the hollow cylindrical part 7 as viewed in the primary flow direction 9. The inside periphery of this guide ring 10 merges seamlessly with the inside circumference of the hollow cylindrical part 7 (see FIG. 3). The adaptor portion 8 serves to compensate for tolerances with respect to angle and spacing between the engine 1 and carburetor 3 inside the housing 2 and is elastically deformable for this purpose.

Adjoining the adaptor portion 8 in the direction toward the engine 1 is a further tubular part 11, which tapers conically toward the engine 1 and communicates with a sealing collar 12. The sealing collar 12 is configured in correspondence to the intake pipe (not shown in FIG. 3) of the engine 1 and, in the installed condition (FIG. 1), the collar 12 is tightly joined to the housing of the engine 1 such that the inner wall 6 of the tubular portion 11 merges flush with the inner wall of the intake opening of the engine 1. In this embodiment, the sealing collar 11 is mounted obliquely on the tubular part 11 to compensate for the angle between the outlet opening of the carburetor 3 and the intake opening of the engine 1.

The inner wall 6 of the elbow 4 is provided with a plurality of protrusions 13, which in the embodiment of FIG. 4 are configured by the upper edges of funnel-shaped, prismatic indentations 13a, as also shown in FIG. 5.

Figure 3:
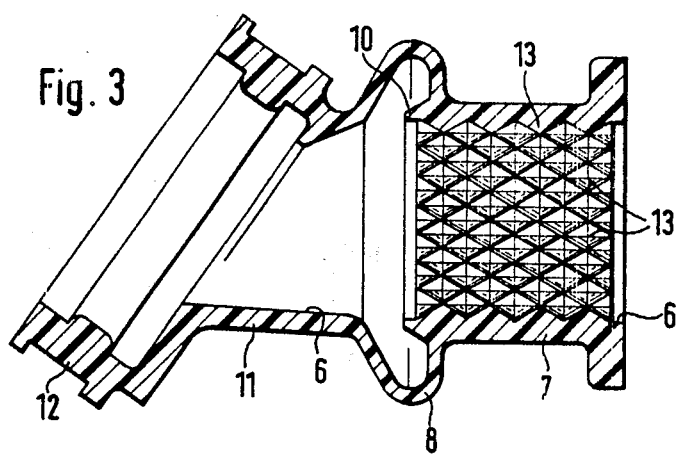
FIG. 3 is a longitudinal section view through the connecting piece of FIG. 2.

In the embodiment shown in FIGS. 6 and 7, the protrusions 13' are prismatic. This structure is also shown in FIG. 3. The protrusions 13 or 13' in this embodiment are distributed over only the part 7 of the inner wall 6, but they may also be disposed over the entire inner wall 6, for example on the inner wall of the hollow cylindrical part 7, the adaptor part 8, the guide ring 10 and the tubular part 11. All the other surfaces of the connecting piece 4 are advantageously embodied without irregularities. The protrusions 13 or 13' are arranged closely next to each other over the entire periphery of the inner wall 6. The protrusions form annular rows disposed one behind the other.

In FIG. 6, the prisms of successive rows mesh with one another; that is, they are offset from one another in the flow direction 9. In other words, there are no continuous rectilinear channels in this primary flow direction 9 of the combustion gases or gas mixture flowing from the carburetor 3 to the engine 1. The protrusions 13 of FIG. 4 are disposed relative to one another such that successive, transversely disposed protrusions are each separated from one another by indentations. Of the protrusions 13 located one behind the other in the flow direction but disposed transversely to this direction, the rearward protrusions close or block off the gaps between the protrusions located ahead of them (see FIGS. 4 and 5), so that also in this embodiment, the formation of axially parallel channels on the inner wall 6 is avoided.

Instead of the version of FIG. 6, pyramid-shaped protrusions 13' can be disposed on a helical path, as shown in FIG. 8. Here the protrusions in adjacent paths are offset from one another. Accordingly, there are no continuous channels in the flow direction. The dimensions of the funnel-shaped prismatic indentations 13a and of the pyramid-shaped protrusions 13' are arranged such that a thick gap-free network of protrusions is provided which completely cover the inner wall 6. The rhomboid area of the base of such an indentation or pyramid amounts for example to between 2 and 8 mm² for an inner wall diameter of 15 mm.

During operation of the tool, the fuel-air mixture produced by the carburetor 3 flows in the direction 9 through the connecting piece 4 to the engine 1 (FIG. 1). Some of the fuel deposits in liquid form on the inner wall 6 where at least some of it forms a fuel film which, depending on pressure conditions between the engine and the carburetor, is pulled along the inner wall 6 in the direction 9 or in the direction opposite thereto. When the portions of the fuel deposited on the inner wall 6 are aspirated into the engine 1, the fuel film is interrupted by the protrusions 13 or 13' and tears off, so that only a small portion of the quantity of fuel adhering to the wall 6 is aspirated into the combustion chamber of the engine 1 at any one time.

The aforementioned problems of transient overenrichment are avoided in the embodiment described above because a direct flow between the carburetor 3 and the engine 1 along the inner wall 6 of the elbow 4 is prevented by the protrusions 13 or 13'. With these embodiments, rpm fluctuations can be reduced to such an extent that quiet operation of the engine 1 is attained.

Since the protrusions in the above-described embodiment are disposed over the entire inside periphery of the inner wall 6, liquid parts of the fuel are also effectively prevented from flowing along the inner wall 6 from the carburetor 3 to the engine 1 when the motor-driven tool is swung upside down or in some other direction. As a result, great constancy in the idling rpm is assured, even when the motor-driven tool is swung and moved. If this should be unnecessary, for instance in the case of stationary machines, then it is sufficient to provide the protrusions in the region of the connecting piece at which liquid fuel flows along the inner wall to the engine.

FIG. 10, like FIGS. 4 and 8, shows the inner wall of the connecting piece in a developed projection. In the embodiment shown in FIG. 10, semi-spherical protrusions 13" are provided (see also FIG. 11), which are staggered in the flow direction 9 with respect to one another such that the protrusions of each successive row are placed in front of the gaps between each two mutually adjacent protrusions of the preceding row. The protrusions 13" are disposed close to one another, such that a labryrinthine network of channels is formed between them, and the fuel flow along the inner wall 6 is compelled to follow this route thereby causing the fuel flow to tear off repeatedly and continually as intended.

In the arrangement of FIGS. 4, 6 and 8 corresponding to a cross-knurling, the number of protrusions per unit of surface area is particularly high, causing the flow of fuel to tear off particularly often along the inner wall 6. In this embodiment, the indentations 13a or protrusions 13' have rhombic base areas immediately adjoining one another. Because of the edges of the protrusions 13 located transversely to the longitudinal axis of the elbow, or because of the protrusions 13' tapering prismatically to a point, reliable tearing off of the flow at the inner wall 6 is assured even in the presence of relatively large quantities of fuel.

The protrusions may taper to a more or less sharp point, or as in FIG. 10 may be rounded off, or may be slightly flattened on their top. However, the slenderness of a protrusion should decrease toward the middle of the connecting piece. If the cross-knurling of FIGS. 4 or 6 is used, a symmetrical embodiment is preferred so that performance will be uniform at every point of the inner wall of the connecting piece.

With the connecting piece according to the invention, steady and quiet engine operation, particularly during idling, is attained, even if the engine has only very low centrifugal mass, as modern internal combustion engines typically do. Engine wear is reduced as a result, and the idling rpm can be exactly and precisely set and maintained. The invention is intended in particular for motor-driven tools operated with two-stroke engines because here the effect of an rpm fluctuation caused by the low centrifugal mass and the severely pulsating pressure fluctuations between the carburetor and engine is perceptible to a particularly severe degree. However, the invention is not limited to such an application; the use of a connecting piece according to the invention can also bring about notable improvements with four-stroke engines or other engine types.

It is understood that the foregoing description is that of the preferred embodiments of the invention and that various changes and modifications may be made thereto without departing from the spirit and scope of the invention as defined in the appended claims.

What is claimed is:

1. A connecting piece for connecting a carburetor to the combustion chamber of the engine of a power-driven tool such as a motor-driven chain saw or the like, the connecting piece conducting the air-fuel mixture in a primary flow direction from the carburetor to the combustion chamber, the connecting piece comprising: an annular conduit-like member defining a longitudinal axis and having an inner wall surface; and, a thick plurality of protrusions formed over a substantial portion of said inner wall surface, said protrusions being disposed one behind the other as seen in said flow direction in a manner so as to prevent the formation of channels in a direction parallel to said axis.

2. The connecting piece of claim 1, wherein said engine is a two-stroke engine and said protrusions are distributed over all of said inner wall surface.

3. The connecting piece of claim 1, said protrusions each having a rounded configuration and being arranged in a plurality of rows, the protrusions of each row being displaced with respect to the protrusions of the next adjacent row.

4. The connecting piece of claim 3, said protrusions each having a semi-spherical configuration.

5. The connecting piece of claim 1, said protrusions being grouped into a plurality of sets of protrusions, said sets of protrusions being arranged in a corresponding number of helical paths formed on said inner wall surface.

6. The connecting piece of claim 5, said helical paths being one adjacent the other and the protrusions in each path being displaced with respect to the protrusions of the next adjacent path.

7. The connecting piece of claim 5, said protrusions each being configured so as to have an approximately pyramidal shape.

8. The connecting piece of claim 7, said protrusions each being tapered toward said axis so as to terminate in respective points.

9. The connecting piece of claim 1, said protrusions being formed by cross-knurling.

10. The connecting piece of claim 9, said inner wall surface having a plurality of prismatic indentations formed therein so as to have upper edges defining said protrusions.

11. A connecting piece for connecting a carburetor to the combustion chamber of the engine of a power-driven tool such as a motor-driven chain saw or the like, the connecting piece conducting the air-fuel mixture in a primary flow direction from the carburetor to the combustion chamber, the connecting piece comprising:
an annular conduit-like member defining a longitudinal axis and having a first inner wall surface;
an annular insert having a second inner wall surface and being mounted in said conduit-like member so as to be seated on said first inner wall surface; and,
a thick plurality of protrusions formed over a substantial portion of said second inner wall surface, said protrusion being disposed one behind the other in said flow direction so as to prevent the formation of channels in a direction parallel to said axis.

* * * * *